Figure 1:
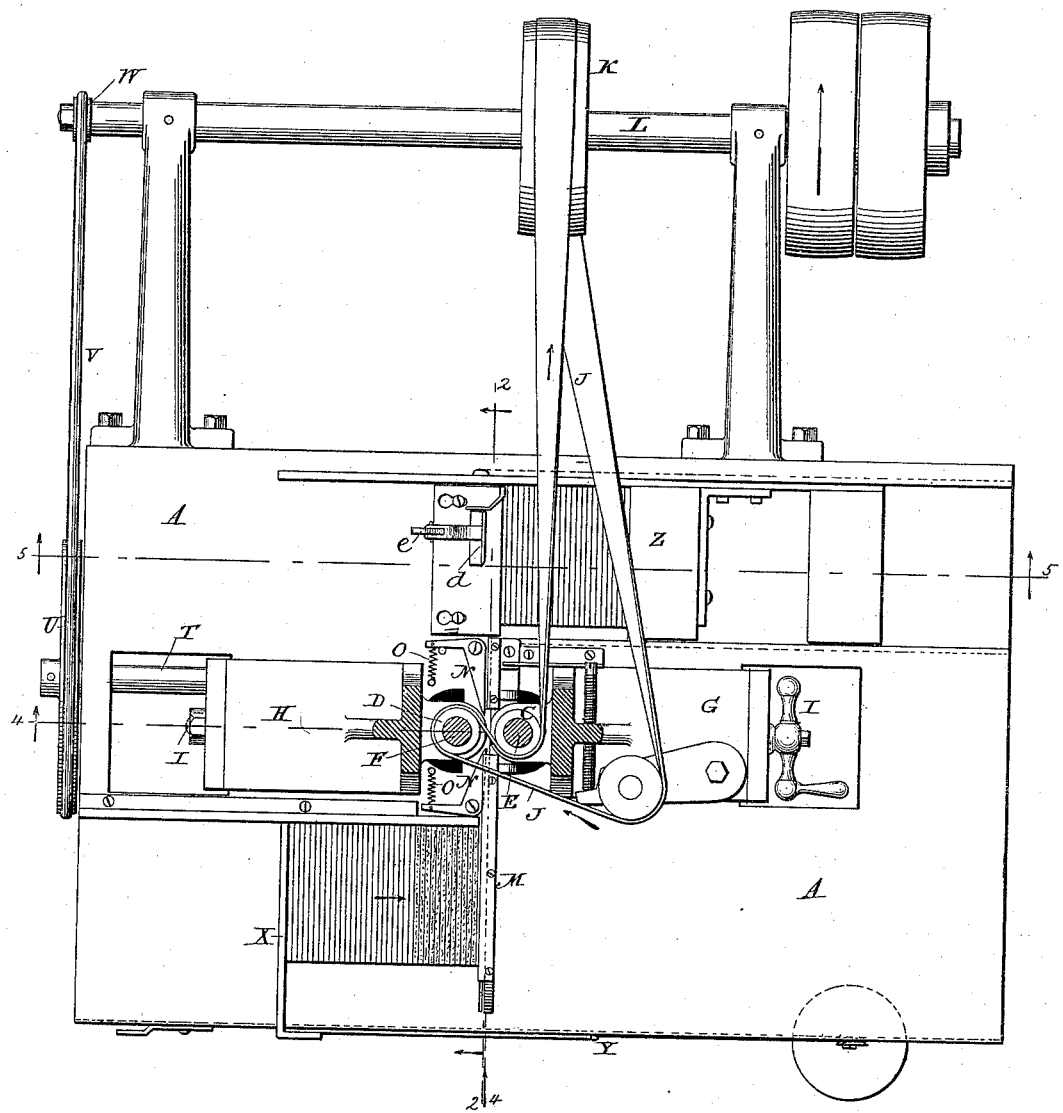

(No Model.)

3 Sheets—Sheet 1.

O. MERGENTHALER.
MACHINE FOR DRESSING TYPE BARS.

No. 328,961. Patented Oct. 27, 1885.

on line 1–1

WITNESSES

INVENTOR
Ottmar Mergenthaler
By Philip T. Dodge
Attorney

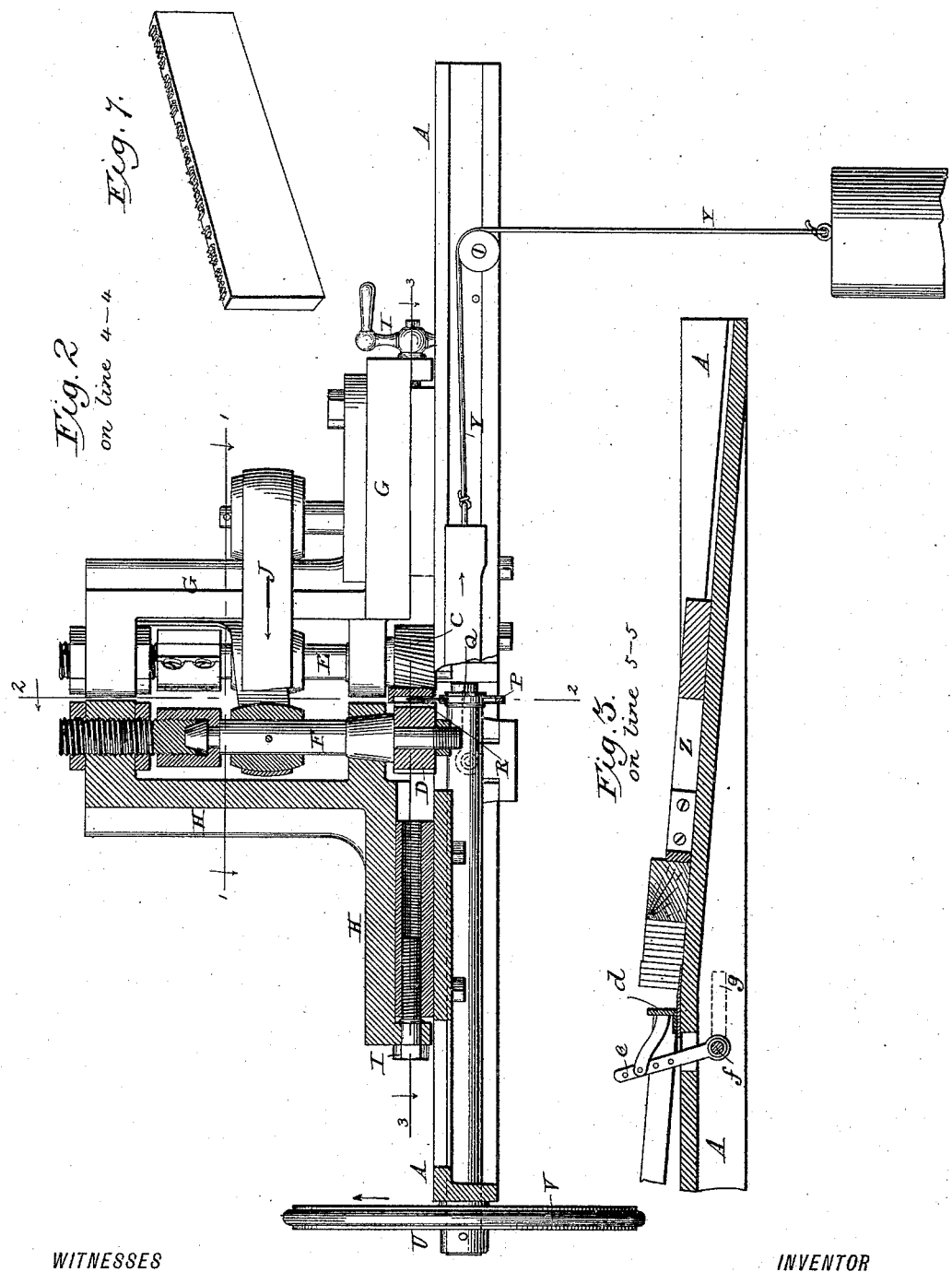

(No Model.) 3 Sheets—Sheet 3.
O. MERGENTHALER.
MACHINE FOR DRESSING TYPE BARS.
No. 328,961. Patented Oct. 27, 1885.
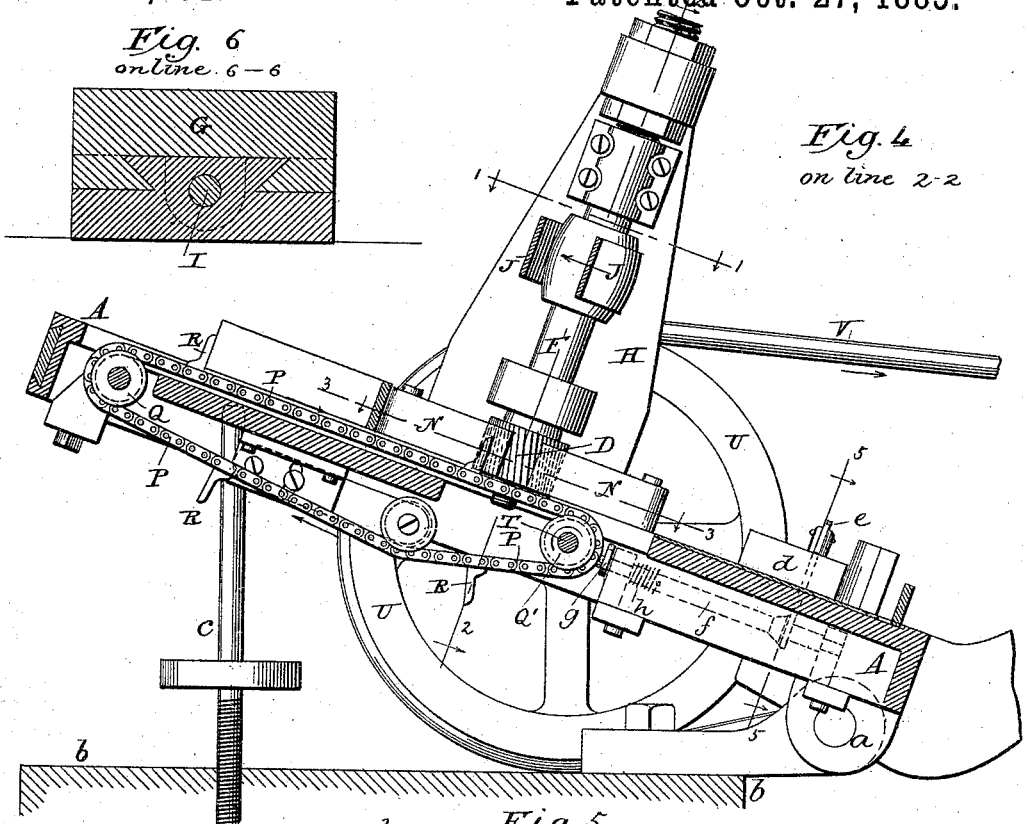
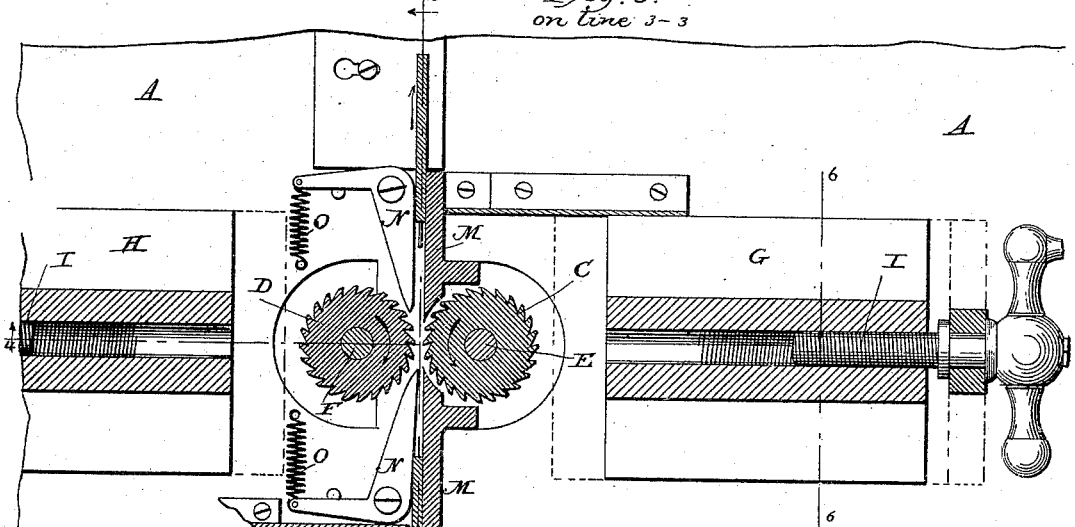
WITNESSES
INVENTOR
Ottmar Mergenthaler
By Phil. T. Dodge
Attorney

United States Patent Office.

OTTMAR MERGENTHALER, OF BALTIMORE, MARYLAND, ASSIGNOR TO THE NATIONAL TYPOGRAPHIC COMPANY, OF WASHINGTON, D. C.

MACHINE FOR DRESSING TYPE-BARS.

SPECIFICATION forming part of Letters Patent No. 328,961, dated October 27, 1885.

Application filed May 19, 1885. Serial No. 166,035. (No model.)

*To all whom it may concern:*

Be it known that I, OTTMAR MERGENTHALER, of Baltimore city, in the State of Maryland, have invented certain Improvements in Machines for Dressing Type - Bars, &c., of which the following is a specification.

The machine forming the subject of my invention is designed more particularly for planing or dressing the side faces of what are known as "type-bars"—that is to say, soft-metal bars bearing on one edge in relief the type to print a plurality of words.

To this end it consists in the peculiar construction and combination of revolving cutters, guide and pressure devices, and a feed mechanism, as hereinafter fully explained.

Referring to the accompanying drawings, Figure 1 is a top plan view of the machine, the driving-shaft being shown in horizontal section on the line 1 1 of Figs. 2 and 3. Fig. 2 is a vertical cross-section on the line 4 4 of Fig. 1. Fig. 3 is a cross-section through the galley or receiving-table on the line 5 5 of Figs. 1 and 4. Fig. 4 is a vertical cross-section of the machine on the line 2 2 of Figs. 1, 2, and 5. Fig. 5 is a horizontal section, on an enlarged scale, on the line 3 3 of Figs. 2 and 4. Fig. 6 is a cross-section on the line 6 6 of Fig. 5. Fig. 7 is a perspective view of one of the type-bars such as my machine is intended to operate upon.

In constructing my machine I first provide a flat bed or table, A, of any suitable form and material, and sustain the same preferably in an inclined position in any appropriate manner. I prefer to cast the bed-plate in one piece and attach the same at one edge by hinges $a$ to a support, $b$, provided with a screw or other adjustable support, $c$, acting beneath the free edge of the table for the purpose of giving the same more or less inclination, as may be required. At a suitable point above the table I place side by side two cylindrical cutter-heads, C and D, having peripheral teeth. These heads are of such form and are placed at such distance apart that the printing-bars in passing between them will be finished with smooth parallel surfaces on opposite sides. The cutters are attached to the lower ends of upright spindles E and F, which are supported, respectively in independent sliding frames G and H, connected to the bed-plate by dovetailed guides, or similar connections, which will admit of their being moved horizontally in order to vary the distance between the cutters, as well as the relation between the cutters and the guides. The spindle-supporting frames G and H may be of any appropriate form, and the spindles seated therein in any ordinary or appropriate manner, these features constituting no essential part of the present invention. I recommend the employment of spindle-bearings such as represented in Fig. 2; but as these bearings constitute the subject-matter of a separate application, it is deemed unnecessary to describe them in detail herein.

Each of the spindle-carrying frames is provided with a swiveled adjusting-screw, I, having its bearings in the bed-plate or other stationary part of the frame, these screws serving as a means of accurately adjusting and securely fixing the distance between the cutter-heads.

The cutter-spindles are each provided with a pulley, and are both driven by a belt, J, passing around said pulleys and thence to a driving-pulley, K, on a horizontal driving-shaft, L, mounted in bearings attached to the bed-plate or to the main frame of the machine. The arrangement of the belt is such that the two cutters are revolved toward each other in the opposite direction from that in which the type-bars are to be passed between them, as indicated by arrows in the several figures.

For the purpose of supporting and guiding the type-bars and directing them endwise between the cutters, I mount on the bed-plate the stationary guide or rib M, having its face perpendicular to the bed, and having at its middle an opening through which the cutter-head C projects from the rear side. The extent to which the cutter projects may be regulated by turning its adjusting-screw I. For the purpose of holding the bars against the face of the guide or support M, I provide two angular levers, N, pivoted to the bed-plate and acted upon by springs O. For the purpose of delivering the bars successively and automatically between the cutters, I provide an endless chain, P, traveling around guide-pulleys Q Q', and provided with fingers R. At the upper side of the chain the fingers project above the surface of the table, so as to act upon the ends of the type-bars presented in front of them, and force the latter forward endwise over the table and between the cutters. The pulley Q', which imparts motion to the chain, is mounted on one end of a horizontal shaft, T, which extends through bearings beneath the bed-plate, and receives motion by a pulley, U, on its outer end through a chain or pulley, V, from a pulley, W, on the main driving-shaft L, as plainly represented in Figs. 1, 2, and 4. The bars to be dressed are assembled side by side in a compact group or column on the upper side of the table, and are urged forward toward the support M into the path of the chain by a reciprocating follower or pressure-head, X, which is urged forward by a weighted cord, Y. The bars issuing from between the cutters are delivered on the lower edge of the table, and are automatically advanced one after the other toward a yielding support or head, Z, of a reciprocating follower or pressure device, d, actuated, as shown in Fig. 3, by an arm, e, on a rock-shaft, f, mounted in bearings beneath the bed-plate. This shaft is turned in a forward direction by means of an arm, g, secured to its inner end in position to be encountered by the fingers R of the chain, each of which acts through the intermediate parts to advance the pressure-head d. The return of the head, after being advanced, is effected by means of a spring, h, connected with the rock-shaft, as seen in Fig. 4.

The operation of the machine is as follows: The machine being set in motion, the cutter-heads revolve in the direction indicated by the arrows, and the fingers of the chain travel downward successively over the bed between the cutters. The bars to be dressed are placed on the upper part of the table side by side, subject to the pressure of the movable follower X, which urges the entire series forward, so that the foremost bar bears against and is supported by the plate M. The first advancing tooth of the chain acts against the forward bar and drives the same downward endwise over the table and between the cutters, the bar being held and guided accurately in its passage by the plate M on one side and the pressure-arms N on the opposite side. The finished bar, emerging from the cutters, passes downward in advance of the reciprocating pressure device d, which is at that instant retracted. The pressure device then advances and forces the bar forward sidewise against the one next in advance, and so on repeatedly, bar after bar being added to the group in advance, and the series thus assembled in the form of a column and in the order of sequence in which they are to be used, so that they may be removed at once to the printing-press.

In the dressing of type-bars it is necessary that the line of type shall extend parallel with the side faces of the bars; that they shall be finished with extreme accuracy; and that the slight amount of metal which is removed be cut equally from the two sides of the bar, to the end that the characters which have nearly the same width as the bar may not be mutilated. With these ends in view the particular arrangement of the cutter-heads with respect to the supports M and N is of great importance. While I prefer to retain substantially the details of construction herein represented as being the best known to me at the present time for the purposes in view, it will be understood by a skilled mechanic that the details may be variously modified without departing from the limits of my invention.

The continuously-revolving feed-chain is not a necessary feature of my invention, since it may be replaced by a reciprocating feed device, or the feed device entirely omitted and the bars advanced by hand.

It will be observed that, owing to the downward inclination of the bed or table, the bars descend in passing through the machine. This arrangement is advantageous, in that it facilitates the movement of the bars and permits the free discharge of the chips or shavings, so that the working parts remain free from obstruction.

In passing through the machine the type-bars stand on edge, the edge bearing the type being uppermost. This is important, in that the type are left free from wear and protected from that injury or mutilation to which they would otherwise be subjected.

Having thus described my invention, what I claim is—

1. In a machine for dressing metal type-bars, the combination, substantially as described, of the two rotary milling-heads or cutters, the stationary guide through which one of the heads acts, and the yielding pressure-arms.

2. The combination of the two cutter-heads, suitable guides to direct the type-bars between them, the feed-chain provided with a plurality of feed-fingers, and mechanism, substantially as described, for driving said chain in a forward direction, whereby the bars may be advanced one after another by the successive fingers to the cutters.

3. The two cutter-heads and suitable guides for the bars in their passage between the heads, in combination with the feed-chain provided with a series of fingers and moving always in one direction, and a pressure device, X, acting transversely of the chain, substantially as described, whereby the type-bars are delivered successively and automatically to the successive feed-fingers of the chain.

4. In combination with the two cutter-heads and a bar or table to receive the type-bars therefrom, a reciprocating head or pressure device, substantially as described, to advance the bars sidewise, and a yielding resistant, substantially as described, against which the bars are assembled, whereby the bars are automatically arranged in column form after leaving the cutters.

5. The cutters, the endless feed-chain provided with fingers, the reciprocating pressure device $d$, the rack-shaft actuated by the teeth of the chain, and connecting devices, substantially as described, for imparting motion from the rock-shaft to the pressure device, said parts combined with joint operation, as set forth.

6. In combination with the bed to sustain the type-bars on edge, the upright guides to act on the vertical faces of the bars, cutter-heads and their spindles, and the supporting-frames for said spindles adjustable to and from each other, substantially as and for the purpose described.

7. In an automatic machine for dressing the sides of type-bars, the rotary cutters, in combination with the feed device to pass the bars endwise between them, the follower X, reciprocating at right angles to the path of said feed device to advance the bars thereto, the reciprocating pressure device $d$, acting at right angles to the path in which the bars are delivered from the cutters, and the resistant, substantially as described, whereby the bars assembled in column form are delivered automatically and successively between the cutters and reassembled in column form.

8. In combination with the cutter-heads, and the feed mechanism, substantially as described, for delivering type-bars endwise between said heads, the supporting bed or table extended downward in an inclined position beyond the delivery side of the cutters, substantially as described and shown, whereby each type-bar is caused to pass by gravity away from the succeeding bar and the feed mechanism, to the end that it may be moved laterally out of the path of the next succeeding bar.

9. In a machine for dressing type-bars, the combination of a bed or table to sustain the bars, the two rotary cutters, and the two spindles sustained in bearings wholly above the bed and having the cutters applied to their lower ends.

In testimony whereof I hereunto set my hand, this 14th day of April, 1885, in the presence of two attesting witnesses.

OTTMAR MERGENTHALER.

Witnesses:
 MURRAY HANSON,
 WILLIAM H. BERRY.